(12) United States Patent
Baldsiefen et al.

(10) Patent No.: US 9,365,150 B2
(45) Date of Patent: Jun. 14, 2016

(54) LOADING RAIL AND SLIDING BLOCK FOR A LOADING RAIL

(75) Inventors: Lothar Baldsiefen, Cologne (DE); Dino Valter, Duren (DE); Rene A. Huth, Lohmar (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/237,988

(22) PCT Filed: Jul. 13, 2012

(86) PCT No.: PCT/EP2012/063820
§ 371 (c)(1),
(2), (4) Date: Feb. 10, 2014

(87) PCT Pub. No.: WO2013/010948
PCT Pub. Date: Jan. 24, 2013

(65) Prior Publication Data
US 2014/0248103 A1  Sep. 4, 2014

(30) Foreign Application Priority Data
Jul. 18, 2011 (DE) .......................... 10 2011 079 334

(51) Int. Cl.
*B60P 7/08* (2006.01)
(52) U.S. Cl.
CPC .................................. *B60P 7/0815* (2013.01)

(58) Field of Classification Search
CPC ...... B60P 3/079; B60P 7/0815; B60P 7/0807; B60P 7/0823; B61D 45/001; F16G 11/00
USPC ......... 410/11, 97, 104, 106, 110; 24/265 CD, 24/115 K; 248/499
See application file for complete search history.

(56) References Cited

U.S. PATENT DOCUMENTS

| | | | |
|---|---|---|---|
| 3,877,671 A | 4/1975 | Underwood et al. | |
| 6,585,465 B1 * | 7/2003 | Hammond et al. | 410/104 |
| 7,070,374 B2 | 7/2006 | Womack et al. | |
| 7,556,463 B1 * | 7/2009 | Hall | 410/104 |
| 7,874,774 B2 | 1/2011 | Peterson | |

FOREIGN PATENT DOCUMENTS

| | | |
|---|---|---|
| DE | 102005035319 A1 | 5/2006 |
| FR | 2675442 A1 | 10/1992 |

* cited by examiner

*Primary Examiner* — Stephen Gordon
(74) *Attorney, Agent, or Firm* — Jason Rogers; Price Heneveld LLP

(57) ABSTRACT

A loading rail has a cross-sectional profile which is uniform over at least part of the length of said loading rail, has, on an upper side, a longitudinal groove for receiving at least one sliding block, the longitudinal groove being constricted in an upper region by at least one web, which is attached to a side wall of the longitudinal groove, to form a longitudinal slot, and the web bearing at least one downwardly projecting projection, wherein the projection forms an undercut on a side facing away from the longitudinal slot, as seen from below. The disclosure also relates to a sliding block for a loading rail.

18 Claims, 5 Drawing Sheets

LOADING RAIL AND SLIDING BLOCK FOR A LOADING RAIL

FEILD OF THE INVENTION

The invention relates to a loading rail, in particular for use in vehicles, and to a sliding block for use with a loading rail of this type.

BACKGROUND OF THE INVENTION

When loading vehicles, it is frequently a problem to securely fasten objects such that the latter are fixed to the vehicle during the journey. To this end, it is known, for example, to pull lashing straps, with which load objects are fixed within the luggage compartment of a vehicle, through fixed eyes. However, fixed eyes are not suitable for all loads and situations that occur. More flexible handling can therefore be made possible by fastening elements which are displaceable on loading rails, can be brought into a multiplicity of positions and on which, for example, eyes for lashing straps are arranged. Furthermore, components of workshop equipment, such as, for example, containers for small parts, frequently have to be fastened securely in a vehicle. Increased demands in respect of the handling and the safety are imposed in particular on fastening systems for seats and other objects of vehicle installations which, for example, have to have a sufficient retaining capability even in the event of a crash. In respect of reducing the production costs, it would be desirable to provide a uniform fastening system which meets the demands imposed on handleability and safety for all of the applications mentioned and, at the same time, provides a maximum amount of flexibility and adaptability to different objects to be fixed and fixing locations.

U.S. Pat. No. 3,877,671 discloses a lashing device which consists of elements which are connectable to one another and each have a lashing channel in which sliding blocks, which bear a ring for the fastening of lashing straps, are guided. For the guidance of the sliding blocks, the channel has lips projecting into the channel and lateral projections. This does not make it possible to achieve adequate fixing safety for fastening seats. Furthermore, jamming of the sliding blocks during displacement cannot always be reliably avoided.

U.S. Pat. No. 7,874,774 B2 discloses a loading system for vehicles, in which a sliding block which bears a holder, for example for a lashing strap, is guided in a longitudinal groove of a loading rail. The sliding block has two parallel grooves, in which corresponding projections of the loading rail reach and prevent rotation necessary for the removal of the sliding block from the guide rail. The sliding blocks are likewise clamped via the projections and the grooves of the sliding block. U.S. Pat. No. 7,070,374 B2 discloses a fastening arrangement in which a holder can be clamped in a slot in a rail or can be released therefrom for displacement, the holder having flute regions interacting with the rail, and toothed edges. Even this does not ensure adequately secure fixing for all of the applications mentioned.

It is an object of the present invention to propose a loading rail and a sliding block for a loading rail of this type, by means of which the abovementioned disadvantages are avoided. In particular, this is intended to permit fixing which is as flexible as possible but which at the same time meets the respective safety requirements, both of loads and of installations or seats in a vehicle, along with simple handling.

This object is achieved by a loading rail and by a sliding block as indicated in the independent claims.

SUMMARY OF THE INVENTION

A loading rail according to the invention has a cross sectional profile which is uniform at least over part of the length of the loading rail. The loading rail has, on the upper side thereof, a longitudinal groove which extends at least over part of the length of the loading rail. The longitudinal groove is designed for receiving at least one sliding block, the sliding block being intended to be displaceable over at least part of the length of the loading rail. The longitudinal groove is constricted in the upper region thereof, at least in a subregion of the length thereof, by at least one web, which is attached to a side wall of the longitudinal groove, to form a longitudinal slot. By this means, removal of the sliding block transversely with respect to the longitudinal direction of the loading rail can be prevented in this region. The web bears at least one downwardly projecting projection.

According to the invention, the projection forms an undercut on a side of the projection facing away from the longitudinal slot, as seen from below, i.e. as seen from a lower region of the longitudinal groove. A loading rail according to the invention therefore not only has a first undercut, which comes about by the fact that the longitudinal groove is constricted in the upper region thereof, at least in a subregion of the length thereof, by the at least one web, which is attached to a side wall, to form a longitudinal slot; by means of said first undercut, a sliding block, which is matched to the internal profile of the longitudinal groove, is held in a form-fitting manner in the longitudinal groove of the loading rail against being pulled out upward. The loading rail according to the invention comprises at least one further undercut which is produced, for example, by a bead-like design of the projection projecting downward from the web, or by an inclination of the projection in a direction away from the longitudinal slot; the further undercut also holds the sliding block against being pulled out downward in the upper region of the longitudinal groove. The loading rail according to the invention in this sense has a double undercut. By means of the double undercut, the sliding block is interlocked with the loading rail in such a manner that, even in the event of an extreme loading resulting in a deformation of the loading rail and/or of the sliding block, the sliding block can be prevented from being pulled out of the longitudinal groove.

Owing to the fact that the projection, as seen from below, forms an undercut, when a force which is directed substantially upward is exerted on the sliding block, the sliding block is prevented, with increased reliability, from being pulled out of the longitudinal groove. The sliding block can also be prevented, with increased reliability, from being pulled in a tilted manner out of the longitudinal groove. It has been shown, in particular, that, by means of the design according to the invention of a loading rail, a substantially improved retaining capability can be achieved in the event of a crash. Furthermore, jamming of the sliding block due to unintentional rotation or due to frictional forces during the displacement is reliably prevented. By this means, not only a simplified, in particular lighter construction of the loading rail is made possible using inexpensive materials, but the handling is also improved.

According to a preferred embodiment of the invention, the projection is arranged adjacent to the longitudinal slot. The projection is therefore attached to that edge of the web which forms the border of the longitudinal slot and constitutes a downwardly curved end of the web. This achieves a particularly stable design which, even in the case of a relatively thin-walled design of the loading rail, ensures a particularly high pull-out force.

According to a particularly preferred embodiment of the invention, the at least one projection is directed toward a guide surface of the loading rail. The guide surface can be designed in particular as an inside surface of a side wall of the longitudinal groove. The surface can lie perpendicularly to the upper side of the loading rail or obliquely with respect thereto and can be designed, for example, as a guide slope. Owing to the fact that the projection is directed toward a guide surface, particularly reliable guidance of the sliding block is ensured, thus, with particularly high reliability, ruling out an inadvertent jamming during displacement.

In an advantageous manner, that side of the projection which faces the longitudinal slot forms a slope which runs approximately parallel to a subregion of the surface of the projection on a side facing away from the longitudinal slot, in particular to a subregion of the surface in the region of the further or double undercut. This permits a stable embodiment of the loading rail that can be produced in a particularly simple manner.

Furthermore, it is preferred for the longitudinal groove to be constricted by two mutually opposite webs. In an advantageous manner, each of the two webs bears a projection, it being particularly advantageous for each of the two projections to form an undercut on a side facing away in each case from the longitudinal slot, as seen from below. The two undercuts are therefore directed counter to each other. The loading rail can accordingly also have two guide surfaces. This ensures particularly reliable guidance of the sliding block and a pull-out force which is increased further.

According to a particularly preferred embodiment of the invention, the loading rail is of mirror-symmetrical design with respect to a longitudinal center plane of the loading rail. This means that the two webs and the projections are in each case configured identically, but in a mirror-inverted manner with respect to one another, in the same manner as the guide surfaces optionally are. The symmetrical configuration permits a simple and light construction and also particularly reliable handling.

In an advantageous manner, the loading rail has a flat lower side. The flat lower side can be designed in particular for connecting the loading rail to a base, for example a floor plate, a side wall, a ceiling or another supporting structure of a vehicle. For this purpose, the lower side of the loading rail can be provided, for example, with bores.

The cavity formed within the loading rail, or the longitudinal groove, can furthermore comprise a region which is not required for receiving the sliding block and in which, for example, screw heads or rivet heads of screws or rivets, with which the loading rail is fastened on a base, can be accommodated. This permits simple fastening without the displaceability of the sliding block being impaired.

A sliding block according to the invention comprises a central part and at least one side part, the central part being designed for interaction with a connecting means which is insertable through a longitudinal slot in a loading rail, for example a screw for connection to a fastening means. According to the invention, on an upper side of the sliding block, as seen from a lower side of the sliding block, the at least one side part has an undercut directed toward the central part. The undercut permits interaction with a corresponding projection of a loading rail in order to improve the guidance of the sliding block and to increase the pull-out force.

In particular, a sliding block according to the invention is designed for accommodation in a longitudinally displaceable manner in the longitudinal groove of a loading rail according to the invention. For this purpose, the sliding block in particular has a length which is significantly smaller than the length of the loading rail, and also a cross sectional surface which is uniform over the length of the sliding block. The length of the sliding block, as measured in the longitudinal direction of the loading rail, can be greater than the width of the sliding block, as measured in the transverse direction, i.e. transversely with respect to the longitudinal direction; however, the length of the sliding block can also be the same size as, or smaller than, the width of the sliding block. The cross sectional surface of the sliding block is preferably at least partially shaped in a complementary manner with respect to the cross sectional surface of the longitudinal groove for accommodation in the loading rail. The cross sectional profile here is preferably uniform over the entire, or virtually the entire, length of the sliding block. The sliding block is preferably dimensioned in such a manner that it can easily be displaced, when accommodated in the loading rail, but cannot be rotated to such an extent that frictional forces could result in jamming. For this purpose, a suitable degree of play is provided between the sliding block and the inner wall of the longitudinal groove.

The central part preferably has a slope on the upper side thereof toward the side part. This makes it possible to provide a particularly stable embodiment of the sliding block which can be subjected to high loading. The slope can advantageously be formed approximately parallel to a surface of the side part in the region of the undercut, thus improving the guidance of the sliding block in a corresponding loading rail.

According to a preferred embodiment, the sliding block is of symmetrical design with respect to a longitudinal center plane of the sliding block and has two side parts which in each case, as seen from below, form an undercut directed toward the central part. If the sliding block is inserted into the loading rail, the longitudinal center plane of the sliding block can coincide with that of the loading rail.

In a preferred manner, the sliding block is designed as a sliding nut with a thread for receiving a screw, which is insertable through the longitudinal slot, of a fastening means, the sliding nut serving as a connecting means. The fastening means can serve, for example, for fixing a load item, wherein the fastening means can have, for example, an eye for fastening a lashing strap. However, the fastening means can also have, for example, an installation elbow for the fastening of an intermediate wall or workshop equipment, or else can be designed, for example, for the fastening of a seat.

In a particularly preferred manner, the sliding block is of clampable design for nonpositive fixing on the loading rail. For this purpose, the sliding block can be designed, for example, as part of a clampable fastening element which comprises a fastening means which can be clamped to the sliding block via a screw. For this purpose, the loading rail can have contact surfaces which absorb the forces transmitted by complementary contact surfaces of the sliding block. The design according to the invention of the loading rail and of the sliding block here permits the transmission of particularly high forces without the loading rail being substantially deformed. By means of clamping of the sliding block, for example by tightening of the screw, a particularly reliable fixing of the sliding block and of the fastening element which is connected thereto is therefore made possible in a simple manner. By this means, even objects to which particularly high safety requirements apply, such as, for example, vehicle seats, can be reliably connected to the vehicle.

According to a preferred embodiment, the sliding block is designed in such a manner that whenever the sliding block is accommodated in the loading rail, a clearance remains on the lower side of the sliding block. This has the further advantage that means for fastening the loading rail, for example, to a floor, to a wall or to a ceiling of a vehicle can be arranged in the clearance. For example, screw heads of screws, with which the lower side of the loading rail is fastened to a supporting structure, can be accommodated in the clearance, and therefore the free displaceability of the sliding block is not impaired as a result.

A loading rail according to the invention can advantageously be produced, for example, from steel or from aluminum, for example by bending of a plate or by extrusion. Inexpensive alloys of normal strength can be used here. A sliding block according to the invention can be produced, for example, by cutting a corresponding steel or aluminum profiled bar to size.

The present invention has been described with regard to the fixing of objects in vehicles, but is not limited thereto.

BRIEF DESCRIPTION OF THE DRAWINGS

The invention is explained by way of example below in more detail with reference to the drawings, in which.

DETAILED DESCRIPTION OF THE PREFERRED EMBODIMENTS

Figure 1:
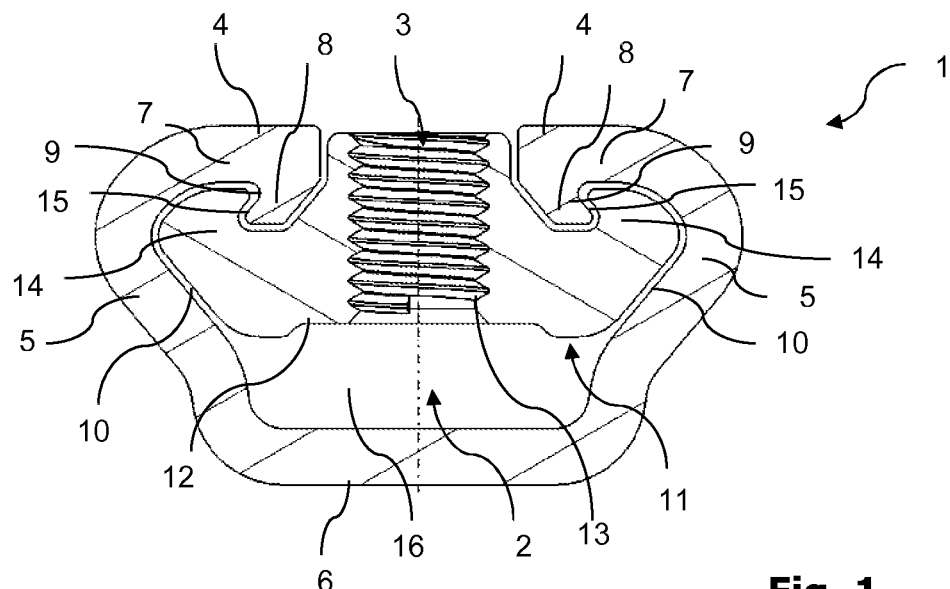
FIG. 1 shows a first exemplary embodiment of a loading rail according to the invention with a sliding block inserted therein, in a cross sectional illustration.

According to FIG. 1, a loading rail 1 according to the invention, which surrounds a cavity 2, is shown in a cross sectional illustration. The cavity 2 is designed as a longitudinal groove which opens with respect to the upper side of the loading rail 1 into a constricted longitudinal slot 3. The loading rail has a substantially flat upper side 4, side walls 5 and a substantially flat lower side 6. The upper side 4 is formed by webs 7 which bound the longitudinal slot 3. Overall, the loading rail 1 is therefore shaped in cross section approximately as a C profile. Flanges or projections 8 which, as seen from below, in each case form an undercut 9 are attached to the webs 7. The projections 8 project into the cavity 2 from above and are in each case directed counter to a guide slope 10.

As FIG. 1 shows, a sliding block 11 is inserted into the loading rail. The sliding block 11 is of substantially complementary design in the cross sectional profile to the shape of the cavity 2 of the loading rail 1. The sliding block 11 comprises a central part 12 which has an internal thread 13, and also two side parts 14. The central part 12 fits into the longitudinal slot 3 and projects through the latter virtually as far as the upper side 4 of the loading rail. The side parts 14 each have an undercut 15 which projects into a groove running between the central part 12 and the side parts 14 and fits together with the undercut 9 of the projection 8. The side parts 14 and therefore the sliding block 11 are guided between the projections 8 and the guide slopes 10, thus avoiding jamming of the sliding block 11 during displacement.

The loading rail 1 and the sliding block 11 are constructed symmetrically with respect to a longitudinal center plane. The flat lower side 6 of the loading rail 1 permits simple fastening of the loading rail to a base, for example to a floor plate or to another vehicle structure. A clearance 16 in which, for example, screw heads or rivet heads of a means of fastening the loading rail to a vehicle structure can be accommodated, can remain below the sliding block 11. This ensures free movability of the sliding block. The raised design of the side walls 5 to ensure the clearance 16 can likewise be advantageous if increased rigidity of the loading rail 1 is desired.

Figure 2:
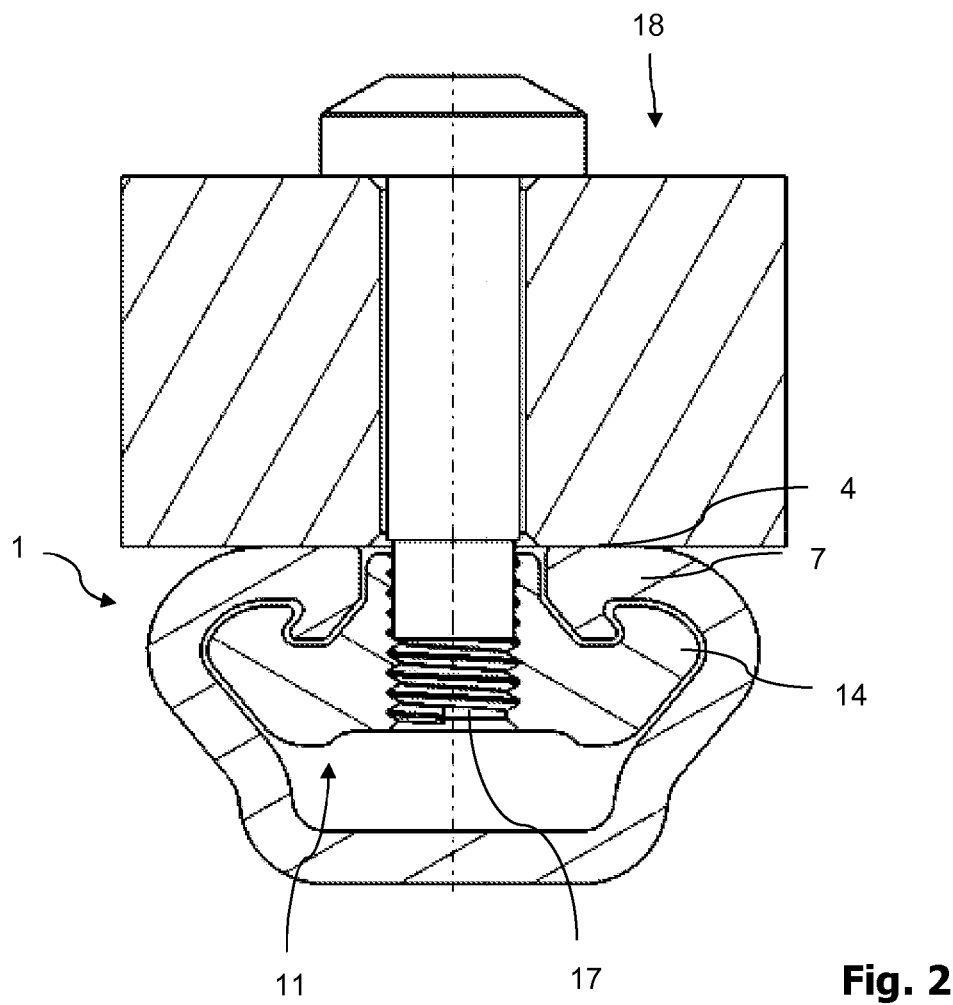
FIG. 2 shows the loading rail with the sliding block according to FIG. 1 inserted therein together with a connecting means and an adaptor.

As FIG. 2 shows, an adaptor 18 can be screwed to the sliding block 11 with a screw 17 serving as a connecting means. The external thread of the screw 17 is not illustrated in FIG. 2. The adaptor can bear fastening means for fastening, for example, lashing straps, installations or seats. Tightening of the screw 17 enables the sliding block 11 to be clamped to the adaptor, and therefore said sliding block is fixed nonpositively to the loading rail 1. The transmission of force between sliding block 11 and loading rail 1 takes place via a contact region which extends in the region of the side parts 14 of the sliding block 11 or in the upper region of the side walls 5 and in the transition region to the webs 7 and optionally on the lower side of the webs 7. Furthermore, there is a frictional connection between the adaptor 18 and the upper side 4 of the loading rail. The interaction of the projections 8 with the complementary shape of the side parts 14 of the sliding block 11 permits the exertion of a particularly high force without a substantial deformation of the loading rail 1 occurring. The loading rail 1 can therefore be of particularly light and optionally flexible design.

Figure 3:
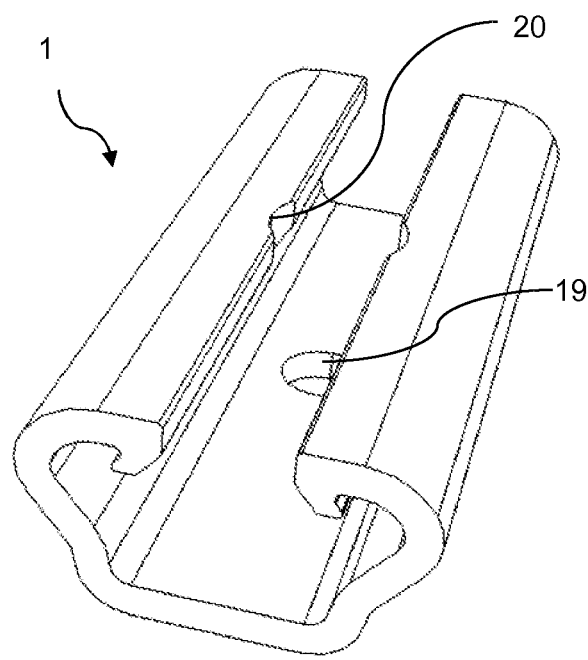
FIG. 3 shows a section of a loading rail according to the invention in a perspective illustration.

FIG. 3 illustrates a section of the loading rail 1 according to FIGS. 1 and 2 in a perspective view. The loading rail 1 has, on the lower side thereof, bores 19 for fastening to a base. Furthermore, recesses 20 permitting an additional form-fitting fixing of a sliding block 11 or of an adaptor 18 can be provided.

Figure 4:
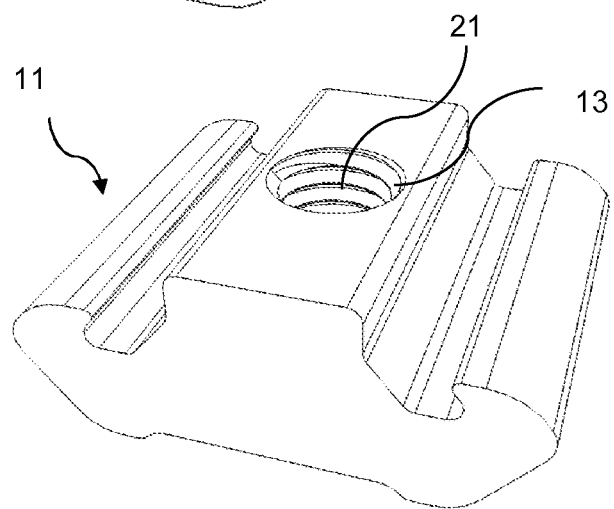
FIG. 4 shows a sliding block according to the invention in a perspective illustration.

FIG. 4 shows a sliding block 11 according to FIGS. 1 and 2 in a perspective illustration. It is seen that, apart from the central bore 21 with an internal thread 13, the sliding block 11 has a substantially constant cross sectional profile over the length thereof. The sliding block 11 can have an approximately identical length to width. Since the loading rail 1 generally has a multiple of the length illustrated in FIG. 3, a plurality of sliding blocks 11 can be inserted into such a loading rail. While the sliding block 11 is prevented by the profile configuration according to the invention from being pulled out in the transverse direction, the sliding block 11 can be inserted into the loading rail 1 from the end thereof and displaced in the longitudinal direction.

Figure 5:
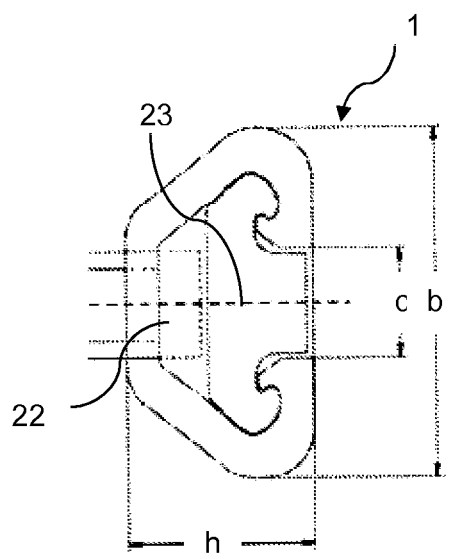
FIG. 5 shows a second embodiment of a loading rail according to the invention, which is arranged for fastening to a vehicle wall.

A further embodiment of a loading rail according to the invention is illustrated in FIG. 5. As indicated by the position of the loading rail in FIG. 5, said loading rail, like the other embodiments described, can be attached, for example, to a vehicle wall. A screw 22 serving for this purpose is illustrated symbolically in FIG. 5. A longitudinal center plane 23 of the loading rail 1, to which the loading rail 1 is of mirror-symmetrical design, is likewise indicated in FIG. 5. The height h of the loading rail can be, for example, approx. 28 mm, the width b can be approx. 60 mm and the width c of the longitudinal slot can be approx. 16 mm. The length of the loading rail can amount to several meters.

Figure 6A:
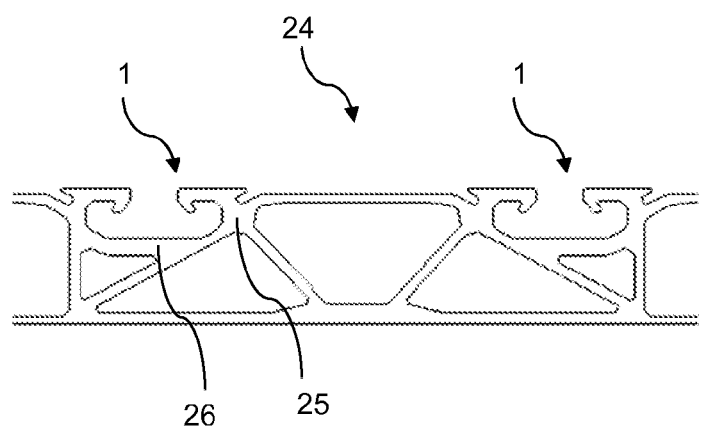
FIGS. 6a to 6c show further exemplary embodiments of loading rails according to the invention, in each case in a cross sectional illustration, which loading rails are integrated in profile elements.
Figure 6B:
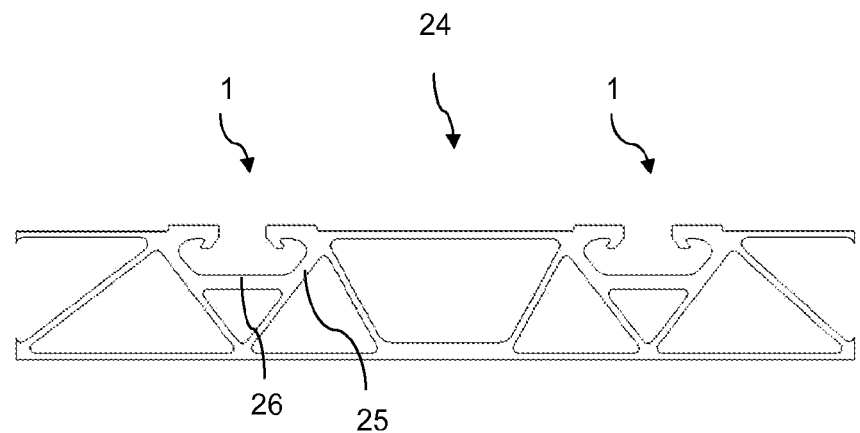
Figure 6C:
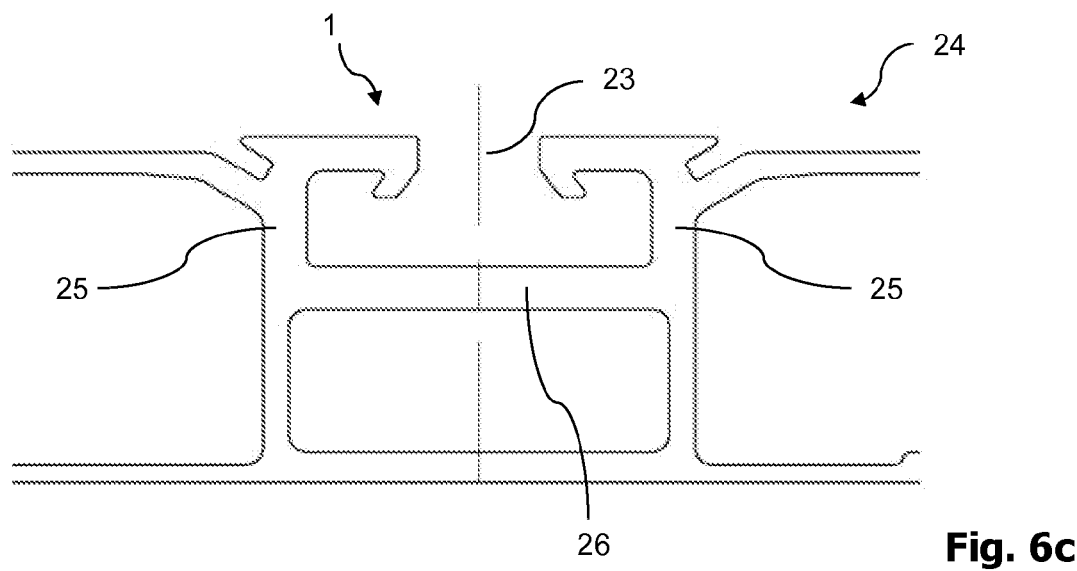

Further embodiments of loading rails according to the invention are shown in FIGS. 6a to 6c. The loading rail 1 here is integrated in each case in profile elements 24 which can be, for example, parts of a floor panel, wall panel or ceiling panel. As can be seen in FIGS. 6a to 6c, the side walls 25 and the lower wall 26 can be designed as cross struts of the profile elements 24 or can be connected thereto, FIG. 6a showing an asymmetrical configuration, and FIGS. 6b and 6c each showing symmetrical configurations, of the integrated loading rail 1. A profile element 24 here can in each case comprise a plurality of integrated loading rails 1. The profile elements 24 can be produced, for example, by extrusion. This makes it possible in a simple manner to provide a highly rigid, secure and versatile fastening possibility capable of bearing loads, for example for loads, installations and seats.

Figure 7A:
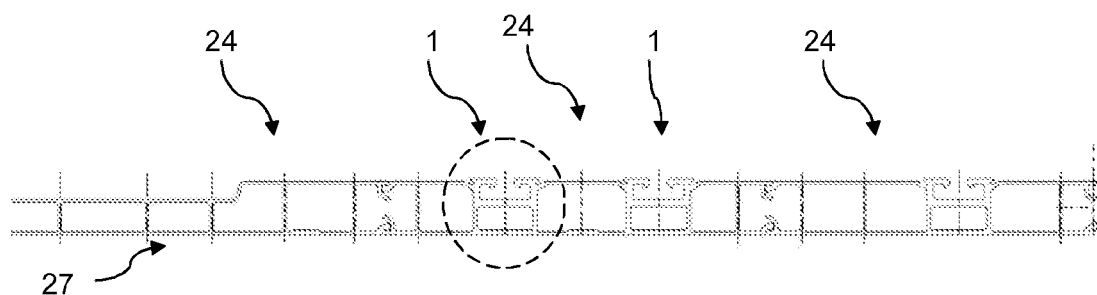
FIGS. 7a to 7c show profile elements or loading floors with integrated loading rails in cross sectional and perspective illustrations.
Figure 7B:
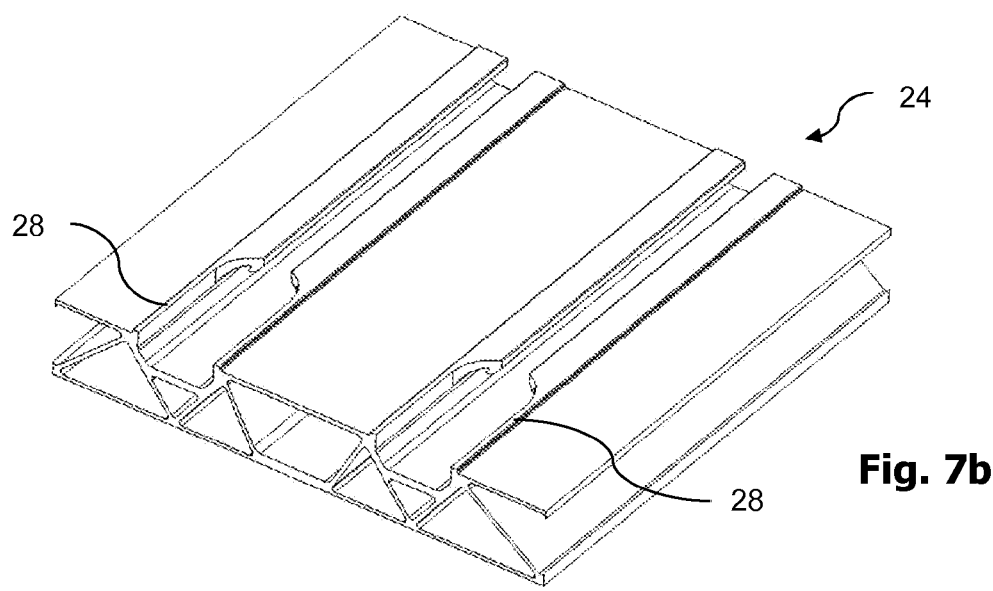
Figure 7C:
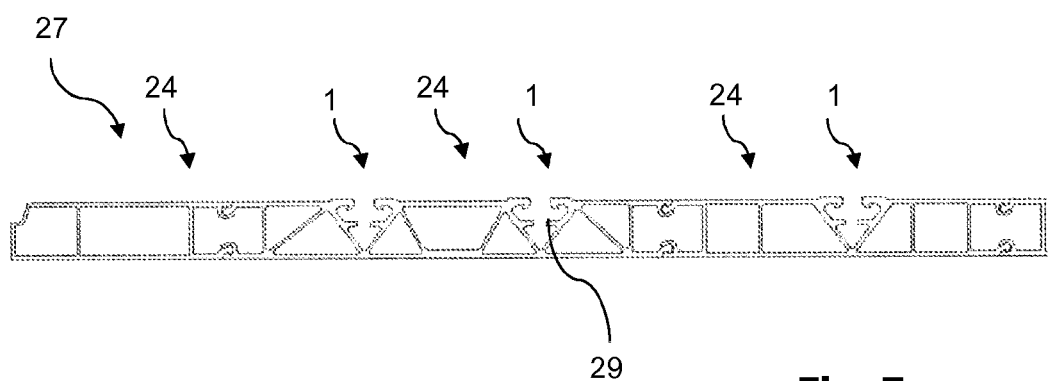

FIGS. 7a to 7c show profile elements or loading floors with integrated loading rails in cross sectional and perspective illustrations, wherein a plurality of profile elements 24 can be connected in each case to form a loading floor 27. The cross sectional profile of the loading rail marked by the circle in FIG. 7a corresponds here to that shown in FIG. 6c. The cross sectional profile of the loading rail of the profile element 24 illustrated in FIG. 7b corresponds to that shown in FIG. 6b, and recesses 28, by means of which the corresponding sliding blocks can also be inserted and removed from above, can be seen in the perspective illustration of FIG. 7b. As FIG. 7b shows, a profile element 24 can also comprise a plurality of integrated loading rails. FIG. 7c shows profile elements 24 with an integrated loading rail having an open base 29, as a result of which increased flexibility of the loading floor 27 formed by the profile elements is achieved.

Figure 8:
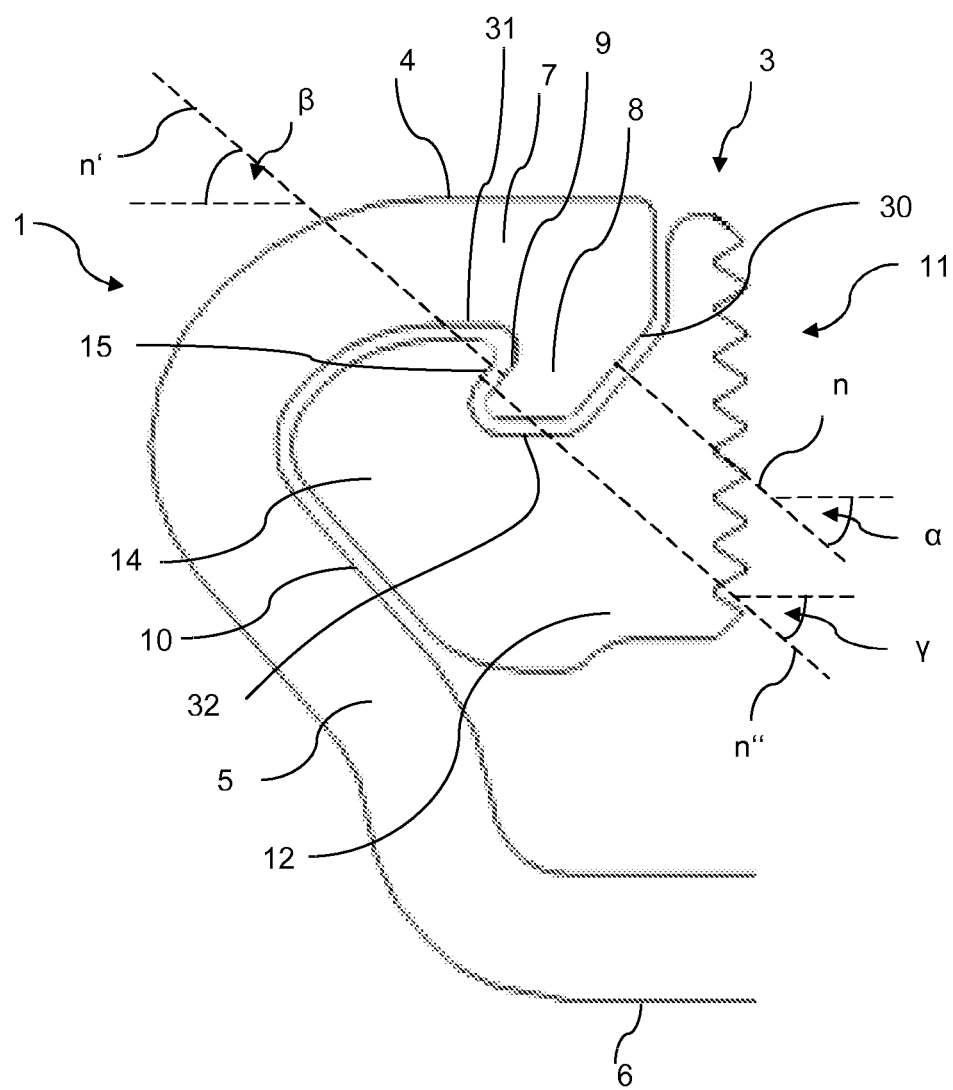
FIG. 8 shows the exemplary embodiment, which is illustrated in FIG. 1, of the loading rail with the sliding block inserted therein, in an enlarged partial illustration.

FIG. 8 shows the loading rail 1 illustrated in FIG. 1 with the sliding block 11 inserted therein, in an enlarged illustration of a detail. The upper side 4 of the loading rail 1 is directed substantially horizontally. That end side of the web 7 which bounds the longitudinal slot 3 is formed vertically in the upper region thereof and merges in the lower region thereof into a slope 30. The slope 30 has a surface normal n which forms an angle α with a horizontal direction. A lower side of the projection 8 adjoining the slope 30 is formed substantially horizontally. The adjoining rear side of the projection 8 has a surface region with a surface normal n' which points away from the longitudinal slot 3, is directed obliquely upward and encloses an angle β with a horizontal direction. In particular, the surface of the web or of the projection, starting from the upper side 4 of the web 7, as far as the region of the undercut is curved by more than 270°, and, starting from the inside 31 of the web 7, is curved by more than 90°.

The cross sectional profile of the central part 12 and of the side part 14 of the sliding block 11 is formed in a complementary manner in the upper region to the inner profile of the loading rail 1. The central part 12 and the side part 14 are separated from each other by a groove 32 which is formed in a complementary manner to the projection 8 and accommodates the latter. An undercut 15 of the sliding block 11 corresponds to the undercut 9 of the loading rail 1, said undercut 15 being formed by an overhang by which the side part 14 projects beyond a base of the groove 31. In the region of the undercut, the side part 14 has a surface normal n'' which is directed obliquely downward with respect to the central part 12 and encloses an angle γ with a horizontal direction.

The surface normals n', n'' run substantially parallel to each other, and therefore β and γ are approximately identical. The surface normal n is also directed substantially parallel to n' and n'', and therefore a also has approximately the same value as β or γ. The angles mentioned can be, for example, within the range of 35°-45°.

For the sake of clarity, not all of the reference numbers are depicted in all of the figures. Reference numbers not explained in the text have the same meaning as in the other figures.

It is to be understood that variations and modifications can be made on the aforementioned structure without departing from the concepts of the present invention, and further it is to be understood that such concept are intended to be covered by the following claims unless these claims by their language expressly state otherwise.

LIST OF REFERENCE NUMBERS

1 Loading rail
2 Cavity
3 Longitudinal slot
4 Upper side
5 Side wall
6 Lower side
7 Web
8 Projection
9 Undercut
10 Guide slope
11 Sliding block
12 Central part
13 Internal thread
14 Side part
15 Undercut
16 Clearance
17 Screw
18 Adaptor
19 Bore
20 Recess
21 Bore
22 Screw
23 Longitudinal center plane
24 Profile element
25 Side wall
26 Lower wall
27 Loading floor
28 Recess
29 Base
30 Slope
31 Inside
32 Groove

The invention claimed is:

1. A loading rail comprising:
a cross sectional profile that is uniform over at least part of a length of said loading rail, the cross sectional profile including:
a longitudinal groove for receiving at least one sliding block; and
at least one web attached to a side wall of the longitudinal groove on an upper side thereof, to form a longitudinal slot constricting the longitudinal groove in an upper region thereof, the web bearing at least one projection, wherein the projection includes an inner radiused portion and a straight portion that extends away from the radiused potion and the web and toward the side wall along an interior angle between 45° and 55° and defines an undercut on a side thereof facing away from the longitudinal slot.

2. The loading rail as claimed claim 1, wherein the at least one projection is adjacent to the longitudinal slot.

3. The loading rail as claimed in claim 1, wherein the straight portion Of the at least one projection is directed toward a guide surface of the loading rail.

4. The loading rail as claimed in claim 3, wherein the guide surface defines a slope on die inside of a side wall of the loading rail, the slope flaring outwardly with respect to the longitudinal groove.

5. The loading rail as claimed in claim 1, wherein the straight portion of the projection includes a first surface defining a portion of the undercut and a second surface opposite the first surface, the first surface and second surface extending generally parallel to each other.

6. The loading rail as claimed in claim 1, wherein the longitudinal groove is constricted by two mutually opposite webs which each bear a projection, the two projections forming respective undercuts.

7. The loading rail as claimed in claim 1, wherein the loading rail is of mirror-symmetrical design with respect to a longitudinal center plane.

8. The loading rail as claimed in claim 1, wherein the loading rail has a flat lower side.

9. The loading rail as claimed in claim 1, wherein the loading rail is installed on a vehicle.

10. A loading rail comprising:
a longitudinal groove constricted in an upper region by at least one web attached to a side wall of the groove to form a longitudinal slot, the web bearing at least one projection having a straight portion thereof extending along an angle of between 45 ° and 55°simultaneously away from the web and toward the side wall and defining an undercut expanding in a direction away from the longitudinal slot on a side of the projection facing away therefrom.

11. The loading rail as claimed in claim 10, wherein the loading rail extends along a length thereof and comprises a cross-sectional profile which is uniform over at least part of the length of the loading rail.

12. The loading rail as claimed in claim 10, wherein the at least one projection is adjacent to the longitudinal slot.

13. The loading rail as claimed in claim 10, wherein the loading rail is installed on a vehicle.

14. The loading rail as claimed in claim 10, wherein the projection further extends outwardly with respect to the longitudinal slot.

15. The loading rail as claimed in claim 10, further including:
at least one profile element extending laterally outward from the side wall of the longitudinal groove on a side of the side wall opposite the longitudinal groove, the at least one profile element defining a portion of one of a floor panel or a roof panel of a vehicle.

16. The loading rail as claimed in claim 15, wherein:
the longitudinal groove is a first longitudinal groove; and
the loading rail further includes a second longitudinal groove, the at least one profile element coupling the first longitudinal groove with the second longitudinal groove.

17. The loading rail as claimed in claim 1, wherein the cross sectional profile further includes:
at least one profile element extending laterally outward from the side wall of the longitudinal groove on a side of the side wall opposite the longitudinal groove, the at least one profile element defining a portion of one of a floor panel or a roof panel of a vehicle.

18. The loading rail as claimed in claim 17, wherein:
the longitudinal groove is a first longitudinal groove; and
the cross sectional profile further includes a second longitudinal groove, the at least one profile element coupling the first longitudinal groove with the second longitudinal groove.

* * * * *